Dec. 23, 1941. W. C. GOSS 2,267,330
LUMBER
Filed Feb. 11, 1939 3 Sheets-Sheet 1

INVENTOR
WORTH C. GOSS
BY
Cook & Robinson
ATTORNEY

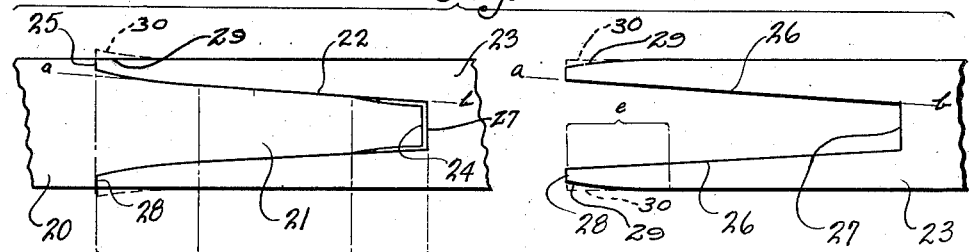
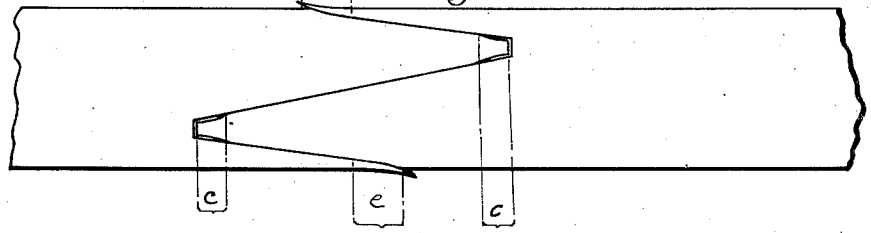
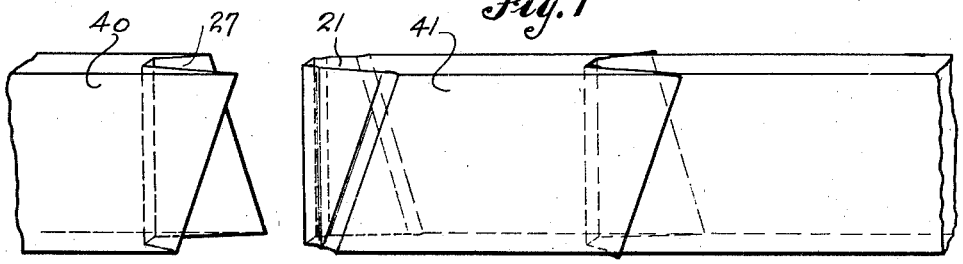
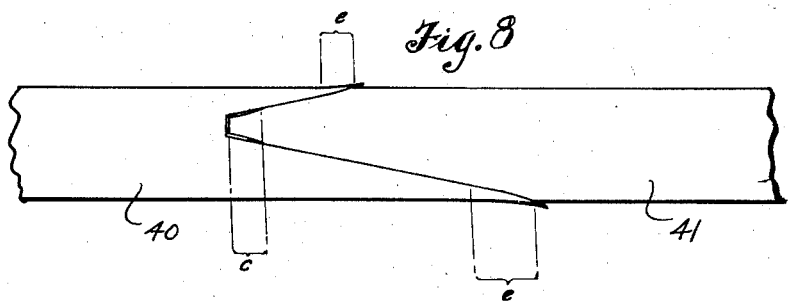

Dec. 23, 1941.  W. C. GOSS  2,267,330
LUMBER
Filed Feb. 11, 1939   3 Sheets-Sheet 3
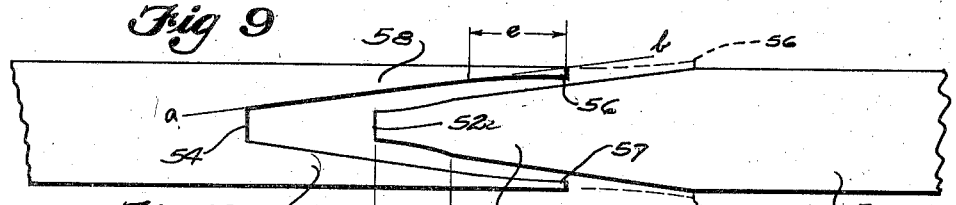
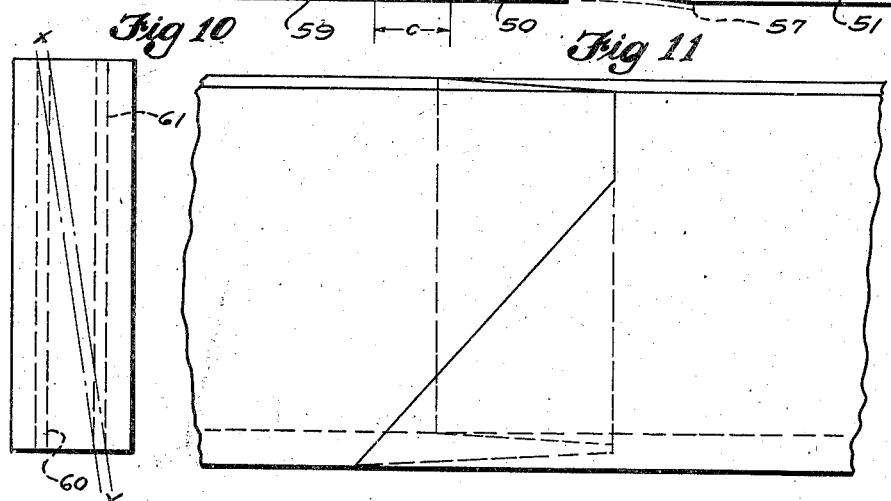
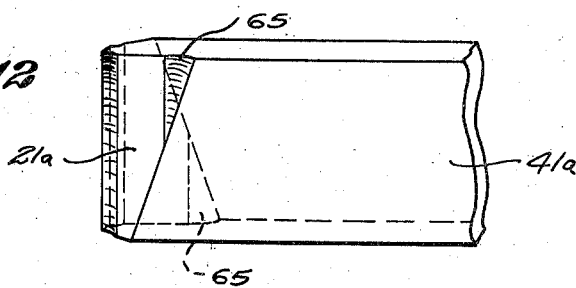
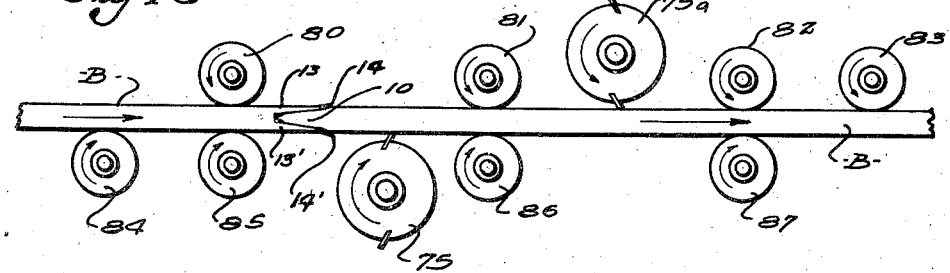
INVENTOR
WORTH C. GOSS
BY
Cook & Robinson
ATTORNEY Patented Dec. 23, 1941

2,267,330

UNITED STATES PATENT OFFICE 2,267,330

LUMBER

Worth C. Goss, Seattle, Wash.

Application February 11, 1939, Serial No. 255,946

7 Claims. (Cl. 20—91)

This invention relates to lumber and to a method of manufacturing lumber, and more particularly, to the fabrication of lumber of standard commercial lengths from short board pieces which ordinarily are disposed of as waste; it being the principal object of this invention to provide a novel form of self-pressing, glued joint whereby short board pieces may be quickly and permanently united, in end to end connection and in close, secure joints, without the necessity for the use of joint pressing clamps or equivalent means.

Furthermore, it is an object of this invention to provide a form of joint that makes it possible to carry on the manufacture or fabrication of lumber from short board pieces as above stated at a cost that is considered reasonable and economical in its commercial aspect.

More specifically stated, the main objects of this invention reside in the formation of a special tongue and groove joint wherein the groove has a width at its mouth that is equal to the thickness of the piece containing it and is of substantial depth and is tapered toward its base at a rather narrow or acute angle, and wherein the tongue that is made to enter the groove is so shaped that spaces are left near its end between its opposite side surfaces and the adjacent side surfaces of the groove, for the reception of glue that must necessarily escape from along the end edge of the tongue as the parts to be joined are pressed together, thus to eliminate the hydrostatic pressure that would otherwise arise and which would cause the joint to automatically open when the joining pressure applied to the pieces was released.

It is also an object of this invention to provide a joint as above stated wherein the side surfaces of the tongue are slightly curved outwardly from the tip to the base, and increasingly curved near the base of the tongue, so that the thin edges of the board at opposite sides of the mouth of the groove will be caused to exert additional pressure against the sides of the tongue and thus insure a close, tightly glued joint between the thin prongs at the mouth of the groove and the base surfaces of the tongue.

The present invention is what may be considered to be an advancement of, or improvement upon the invention which is disclosed in the co-pending application, of O. P. M. Goss and Worth C. Goss, filed August 2, 1937, under Serial No. 156,864, particularly in its reference to the details of preparation of the ends of pieces whereby the joint is made, and while the disclosure of the invention of the above mentioned application is related more particularly to the manufacture of beveled siding, the present invention deals with joints that are desirable not only for the fabrication of boards from which beveled siding is to be made, but also for the joining of ordinary boards for use as joists, studdings, ceiling, sheathing, flooring or inside finishing lumber.

Other objects of the invention are to be found in the details of preparing the tongues and grooves of the parts to be joined, particularly with reference to securing tight joints without necessitating mechanical devices for clamping the parts together, and in the manner of assembling the parts to complete the joint as will hereinafter be fully described.

In accomplishing these and other objects of the invention, I have provided the improved details of construction, the preferred forms of which are illustrated in the accompanying drawings, wherein—

Fig. 5 is a view illustrating a joint of a modified form designed especially for joining pieces of board that are to be used as floor material.

Fig. 6 is a detail showing a joint using two tongues and two grooves in its formation.

Fig. 7 shows, in perspective view, the formation of the parts of a joint adapted to the fabrication of lumber for the manufacture of beveled siding.

Fig. 8 is an edge view of the piece formed by the assembly of the parts seen in Fig. 7.

Fig. 9 is a view illustrating a joint of a modified form.

Fig. 10 is an end view of the board illustrated in Fig. 6 showing direction of resawing for the formation of beveled siding.

Fig. 11 is an inside face view of a piece of beveled siding resulting from the resawing as illustrated in Fig. 10.

Fig. 12 is a view illustrating a modification of the joint of Fig. 7.

Fig. 13 is a diagrammatic view illustrating a means for planing a board surface.

Referring more in detail to the drawings—

Figure 1:
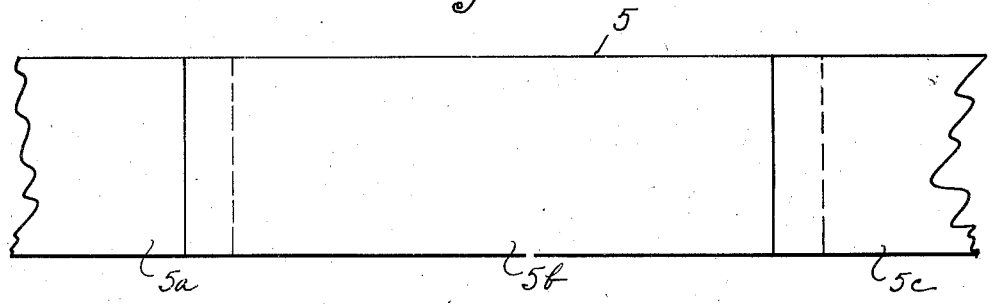
Fig. 1 is a side view of a portion of a board that is made from short lengths of material joined together in accordance with details of the present invention.

First, describing the joint as used for the fabrication of common lumber: In Fig. 1, 5 designates, in its entirety, a section or length of board that has been fabricated from a plurality of short lengths of board trimmings, designated respectively by reference numerals 5a, 5b and 5c, permanently united by joints made in accordance with the present invention; this type of joint as embodied by this invention being characterized as a self-pressing, glued joint, and it is to be understood that it differs from the ordinary type of tongue and groove joint in that a clamping pressure is exerted by the pieces themselves when brought into assembled relationship whereby to cause the joint to set without the use of pressure clamps, or other mechanical devices, for holding the glued pieces firmly seated until the glue sets.

In preparing the ends of board pieces for joining in accordance with this invention, one piece is provided at the end with one or more tongues of narrow elongated form, and the end of the other piece to be assembled in the joint is formed with grooves designed to receive the tongues. The number of tongues and grooves embodied in any joint is a matter to be determined by the character or kind of material that results from the fabrication. For example, ordinary one-inch lumber to be used for siding, roofing or the like, known as "common lumber," could conveniently employ but one tongue and groove to make each joint, while ordinary two-by-fours or two-by-sixes might use two or more tongues and grooves to each joint.

Figure 2:
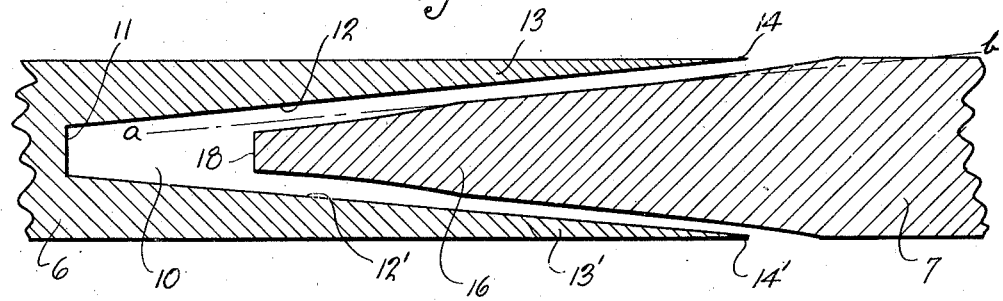
Fig. 2 is an enlarged, cross sectional view of the end portions of pieces to be joined, illustrating their preparation for the joint, and showing the relationship of these parts prior to their being brought together to close the joint.
Figure 3:
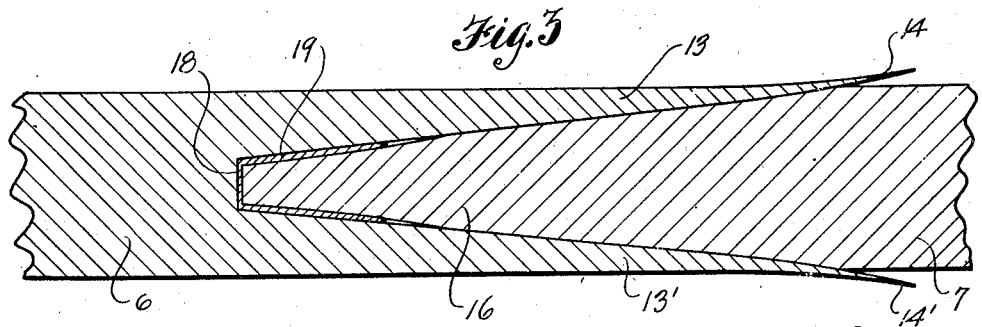
Fig. 3 is a view similar to that of Fig. 2, showing the pieces as fitted together to close the joint.
Figure 4:
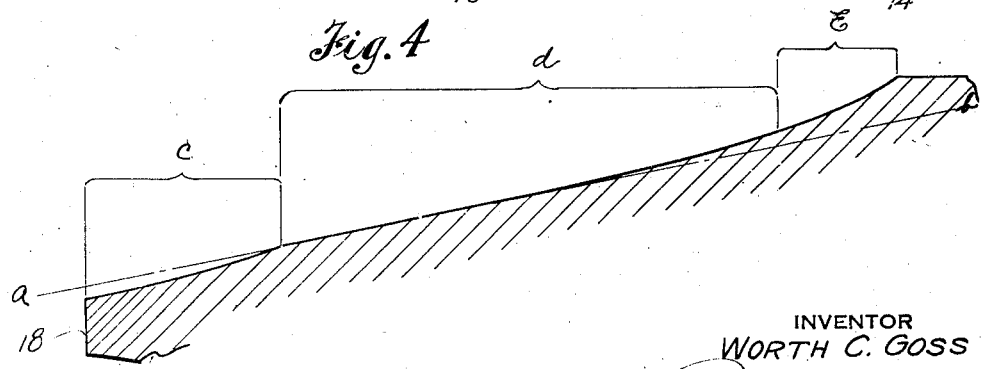
Fig. 4 is a view illustrating in detail the sloping of the side surfaces of a tongue in accordance with details of the present invention.

I will first describe the preparation of the joint that will most commonly be employed in what is known as "common lumber." This joint is understood and described best in connection with Figs. 2, 3 and 4, wherein 6 and 7 designate two pieces of board that are to be joined. The piece 6 is provided at its end with a groove 10 which extends through from edge to edge of the board piece and, at its mouth, is the full width of the piece; this groove tapers from the mouth to a flat, relatively narrow base surface 11. The opposite side surfaces of the groove, designated respectively by reference numerals 12 and 12', are flat, such as would be made by a straight cut of a saw or a straight edged blade on the revolving cutter head. The two elongated prongs of material at opposite sides of the groove, designated by reference numerals 13 and 13', taper to thin edges 14—14'. The angle between the side surfaces of the groove and adjacent side surfaces of the piece should be between 3° and 11° for obtaining the best results, and the groove should be symmetrically located with reference to the central plane of the board.

The piece 7 is formed at its end with a tongue 16, which is adapted to seat within the groove 10 for a glued connection and a self-pressing union. The tongue on piece 7 corresponds substantially in length to the depth of the groove 10 in piece 6, and it tapers to a flat end surface 18. The opposite side surfaces of the tongue have a particular shape that is an important feature of the present invention. This shape is best understood by reference to Fig. 4, wherein the line a—b is a reference line drawn parallel to the plane of the wall surface 12 of a groove 10 in a piece disposed in position to be assembled therewith, preparatory to the closing of the joint. It will be noted that for a short distance along the tongue measured back from its tip end and comprised within that length of the tongue spanned by the bracket C, the surface of the tongue is offset or recessed inwardly and at a slight angle to the line a—b. Then the slope of that surface continuing from the right-hand end of the bracket C is very slightly curved outwardly along an extended distance as comprised within the limits of extent of the bracket d that terminates near the base of the tongue where this slope is then curved outwardly to a greater degree and extends through a distance spanned by the bracket e.

When the two pieces 6 and 7 are brought together with the tongue projected into the groove, the points of the prong 14—14' of piece 6 as noted in Fig. 2, come first against the base edge of the tongue along the lines where the side surfaces of the tongue 16 merge with the side surfaces of the piece 7. Then, by an application of end pressure on the two pieces, the tongue will be seated as seen in Fig. 3, but in this seating operation, the thin flexible edges defined as the prongs 14, will be pressed outwardly by the outwardly curved surface defined within the brackets e, thus causing the pressure at these points to be increasingly applied against the sides of the tongue to give the needed additional pressure that will insure a tight, securely glued joint between the ends of the flexible prongs and the base of the tongue.

In the manufacture of lumber according to the present invention, it is to be understood that glue is applied to the surfaces of the tongue and, if desired, to the side surface of the groove prior to the parts being assembled. The glue should, for best results, be of rather thick consistency. However, since glue of this character has a rather high lubricating value, the parts 6 and 7 under the inward pressure of the prongs 14—14' would spring apart, particularly should there be any hydrostatic pressure built up within the joint, such as might be produced if there were no area provided for the escape of the surplus glue. In the present instance, when the glued parts are brought into position for assembly, as in Fig. 2, and then pressed together endwise, as in Fig. 3, there is an escapement of glue from between the tightly fitting surfaces, particularly from between the end surfaces 11 and 18 of these parts, and in this escape, it finds its way into the open spaces at opposite sides of the tongue, as illustrated in Fig. 3 and indicated by reference numeral 19. This heavy glue then does not act to exert a hydrostatic joint opening pressure. The flexibility that is inherent in the long thin prongs 14, particularly that increasing flexibility that is exhibited at their ends, would not ordinarily permit of a tight joint. However, the rather abrupt outward curving of the side surfaces of the tongue near the base compensates for this increased flexibility, and a tight, close joint will be insured, without mechanical devices or clamps being applied.

When the parts have been assembled and pressed together, as shown in Fig. 3, the piece is allowed to stand until the glue has set. The piece is then passed through a surfacing machine and the outturned prongs are removed, leaving the side surfaces of the piece smooth and the joints tight and practically unnoticeable.

It is contemplated that joints of this character, in slightly modified form, be used in the making of flooring boards, ceiling and the like.

When such lumber is to be used as flooring, it is desirable to eliminate any possibility of the thin, tapered edges slivering or splintering off, and therefore, the joint is modified to the extent that the tapering prongs of the material at opposite sides of the groove be square cut to form flat end surfaces and that the side surfaces of the tongue terminate in square cut shoulders. Such a modified tongue and groove joint is illustrated in Fig. 5, wherein the board piece 20 is provided with a tongue 21, which is seated in a groove 22 in the board piece 23. The construction of the sides of this tongue is in accordance with that previously described in relation to the straight reference line a—b in Fig. 4, the included angle of the tongue, and also the groove, being substantially the same. This tongue corresponds substantially in length to the depth of the groove, and tapers to a flat end surface 24. It will be noted that for a short distance along the tongue, measured back from its tip end and comprised within the limits of the brackets c, the surface of the tongue is offset or recessed inwardly and at a slight angle to the reference line a—b, and that the portion defined within the bracket d is substantially straight, and the portion defined within the bracket e is curved slightly outwardly, terminating in a shoulder portion 25.

The groove is so constructed that its inside surfaces 26 are substantially parallel to the reference line a—b, tapering outwardly from a flat bottom surface 27 to shoulder portions 28 at the mouth of the groove.

It will be noted that the outside surfaces of the prongs of the grooved piece are beveled off, as at 29 in Fig. 5, from their original form which is indicated in dotted outline at 30, so that the material or part of the board that would otherwise project beyond the surface when the pieces were assembled, is removed, thereby forming a smooth joint, as illustrated in Fig. 5.

With reference to the joint illustrated in Fig. 6, which is designed for use in common lumber, this utilizes two tongues and two grooves, so arranged that there is one tongue and one groove in each of the board pieces which is used in the joint. Each tongue is provided at opposite sides of its outer end portion with inwardly recessed areas equivalent to the surfaces designated on the bracketed areas c as previously described, thereby forming pressure relief areas 19 near the base of the groove. Furthermore, each tongue has its side surfaces outwardly curved at its thickest end, as at e, and with the inside surfaces of the grooves each formed on a straight plane, joining of the boards will be accomplished in accordance with the invention as already explained, and in boards of larger dimensions, a much stronger joint is thus provided due to the particular design of the tongue and groove joint.

As seen in Figs. 7 and 8, I have provided a joint that may be considered an improvement in the joint as applied to fabricated lumber intended to be resawn for manufacture of beveled siding as disclosed in copending United States application, Serial No. 156,864. This particular joint utilizes a tongue and groove joint in the lumber, disposed in angular relation to the board surfaces, so that when the rectangular board is resawn diagonally with reference to the side surfaces and through the joints to form beveled siding, the thin upper part of each board will be provided with a lap joint, while the lower or thicker edge of each board piece contains the tongue and groove joints.

The joint as herein modified from that of the copending application above mentioned, embodies the relieving of the surfaces of the tongues for the elimination of hydrostatic pressure, the outward curving of the side surfaces gradually through a certain extent of surface, then the more abrupt outward curving near the base of the tongue, such as is indicated in Fig. 8 on the pieces 40 and 41. The inside surfaces of the groove will, in this instance, be flat plane surfaces.

With reference to the joint illustrated in Fig. 9, which might be considered a modification of the joint illustrated in Fig. 3, it will be noted that the tongue 50 in the board piece 51 is offset or recessed inwardly at a slight angle to the reference line a—b as defined by the bracket c, a short distance back from its tip end 52, and then is substantially a flat surface parallel to the reference line a—b. The groove, in the other piece, is provided with a flat base portion 54 and tapers outwardly at a rather narrow or acute angle, and the prongs 56 and 57 near the mouth of the groove have their inside plane surfaces 58 and 59 curved inwardly for a short distance, as defined by the bracket e. This provides that when the two pieces are brought together in joined relationship, these curved portions of the prongs exert a pressure inwardly, and a tight, close joint will be insured. It is also possible to use a tongue on the board piece 51 similar in construction to the tongue 21 on the board piece 20, in the joint illustrated in Fig. 9, without departing from the spirit of the invention.

As seen in Fig. 10, which is an end view of the board seen in Fig. 6, it will be noted that the two tongues and grooves are shown in dotted outline as at 60 and 61. A board with such a joint may be easily diagonally resawed as on the diagonal lines x—y as shown therein, to form two pieces of beveled siding. This sawing will result in joints similar to those disclosed in my co-pending United States application, Serial No. 156,864, in that the joint in each piece of beveled siding will, at the thin edge, form a lap joint, and at the lower, thicker edge, will be in the form of a tongue and groove joint.

As indicated in Fig. 10, the saw kerf removes the part between the parallel diagonal lines in the resawing operation, and this preferably is equal to the flat end surface of the tongue tip, or the bottom of the groove. The joint in the resulting piece of lumber is illustrated in Fig. 11, showing one piece of the beveled siding, thin at its upper edge, and containing the lap portion of the joint, and thick at its lower edge, and containing the tongue and groove portion of the joint.

Fig. 12 illustrates a modification of the tongue used in the joint of Fig. 7, differing therefrom in that the outwardly curved portion 65 near the base of the tongue 21a in the piece 41a extends parallel to the tip of the tongue, rather than parallel to the base of the tongue, as illustrated in Fig. 7.

Fig. 13 illustrates one means for removing the extending tip portions 14—14' of the prongs 13—13' of the groove 10, after the glue has properly set in the joint. This comprises a pair of high speed revolving cutter heads 75 and 75a disposed respectively below and above the board B, spaced somewhat apart, and revolving in the direction indicated by the arrows thereon. At each side of these cutter heads are a plurality of rollers 80—81—82 and 83, above the board, and 84—85—86 and 87 below the board. As the board travels between the rollers and cutters in the direction indicated by the arrows thereon, the projecting tips 14—14' are removed, leaving a smooth board surface, the direction of rotation of the cutter heads being with the direction of the travel of the boards, rather than opposed, and thereby these projecting tips are removed smoothly and no splintering or slivering is encountered in this planing operation.

It is obvious that the joint as herein illustrated in its preferred form, as well as in the various modifications, might be altered within certain limits with respect to depth, inclination and curvature of surfaces without departing from the spirit of the invention. It is therefore intended that the embodiments herein shown shall be considered as illustrative of the now recognized practical forms; furthermore, that the claims hereto appended be given an interpretation commensurate with the spirit of the invention disclosed.

Having thus described my invention, what I claim as new therein and desire to secure by Letters Patent is:

1. A piece of fabricated lumber comprising board pieces joined end to end in a glued, tongue and groove joint; said groove extending from edge to edge of its containing piece and formed with flat side wall surfaces forming a symmetrically tapered groove from mouth to base, and opening at its mouth to the full thickness of the piece; said tongue likewise extending from edge to edge of its piece and designed to be seated in the groove, and having its opposite side surfaces outwardly curved with a gradually increased curvature near the base of the tongue so that, in seating the tongue in the groove, those portions of the groove containing piece at opposite sides of the groove will be outwardly sprung with a resultant application thereby of joint closing pressure that is effective throughout the extent of the curved surfaces of the tongue.

2. A piece of fabricated lumber comprising board pieces joined end to end in a glued, tongue and groove joint; said groove being of substantial depth, symmetrically tapered, with flat opposite side surfaces, and opening at its mouth to the full thickness of the piece, and providing prongs of material at opposite sides of the groove that taper gradually to thin edges; said tongue likewise extending the full width of the piece and so tapered as to permit it to be seated within the groove and having its opposite side surfaces relieved along the tip end portion of the tongue and slightly and gradually curved outwardly from near the inner end of the tongue to near its base and then increasingly outwardly curved at the base of the tongue thereby to cause, on seating the tongue in the groove, an outward flexing of the prongs that increases toward the end of the prong with a resultant inward application of pressure that tightly closes the joint throughout the extent of contact between tongue and groove surfaces.

3. A piece of fabricated lumber comprising board pieces joined end to end in a glued, tongue and groove joint; said groove being of substantial depth, symmetrically tapered with flat opposite side wall surfaces and a flat base surface, and opening at its mouth to the full width of the piece, thereby providing, at opposite sides of the piece, elongated prongs of material gradually tapering to thin edges; said tongue likewise being extended at its base to the full thickness of the piece and tapered to a degree permitting it to be seated in said groove; with those portions of its opposite side surfaces that are adjacent the end of the tongue inwardly relieved to provide glue receiving pockets, and curved slightly and gradually outwardly from the said pockets toward the base of the tongue and adjacent the base being outwardly curved to a more abrupt extent as a means of causing the outward bending of said prongs when the parts are assembled, with a resultant joint closing pressure throughout the extent of contact between the tongue and prongs.

4. A piece of fabricated lumber comprising board pieces joined end to end in a glued, tongue and groove joint; said groove extending from edge to edge of its containing piece and formed with flat side wall surfaces forming a symmetrically tapered groove from mouth to base, and opening at its mouth to the full thickness of the piece; said tongue likewise extending from edge to edge of its piece and designed to be seated in the groove, and having its opposite side surfaces outwardly curved with increasing curvature toward the base of the tongue, so that, in seating the tongue in the groove, those portions of the groove containing pieces at opposite sides of the groove will be outwardly sprung with a resultant application thereby of joint closing pressure that is effective throughout the extent of the curved surfaces of the tongue; said outwardly sprung portions being relieved on their outside surfaces to an extent whereby they are caused to lie flush with the sides of the board.

5. In a piece of fabricated lumber: board pieces joined end to end in a glued tongue and groove joint; the groove of the one piece being of substantial depth and uniformly tapered and said tongue of the other piece being tapered in accordance with the taper of the groove to be received in the groove in a wedging fit, and with tightness throughout the extent of the joint; the side surfaces of the tongue adjacent its base portion being outwardly curved to an extent that will effect an increase in the joint closing pressure of the overlying portions but without causing separation of the engaging surfaces of the tongue and groove in the remaining portion of the joint.

6. In a piece of fabricated lumber: board pieces joined end to end in a glued tongue and groove joint; the groove of the one piece being uniformly tapered to receive the tongue of the other piece in a wedging fit, and extending through from edge to edge of the piece with those portions of the piece at opposite sides of the groove gradually tapering to and terminating in thin flexible edges; said tongue being tapered from its end to near the base, in accordance with the taper of the groove and contained in the groove in a wedging fit, and having those portions of its side surfaces adjacent the base and overlapped by said thin flexible edges, outwardly curved to such extent as to effect an increase of the joint closing pressure of those thin overlapping portions to compensate for decrease in pressure that results from increased flexibility of those portions, but without effecting any separation of the joining surfaces in the remaining portion of the joint.

7. In a fabricated board for the manufacture therefrom of beveled siding by resawing the board: board pieces joined end to end in a glued joint; each of said pieces being formed at its joining end and adjacent one face of the board from edge to edge with a tapered tongue having a thickness at its base equal to approximately two-thirds the thickness of the board, and formed along the opposite side from edge to edge with a similarly tapered groove; the inner side surfaces of the groove being a continuation of the adjacent side surfaces of the tongue; said groove and said tongue of one piece being complements of the other and interfitted therewith in a tight wedging connection.

WORTH C. GOSS.